US012594504B2

(12) United States Patent
Benbassat

(10) Patent No.: US 12,594,504 B2
(45) Date of Patent: Apr. 7, 2026

(54) IDENTIFYING GAME VIDEO HIGHLIGHTS

(71) Applicant: Sony Interactive Entertainment LLC, San Mateo, CA (US)

(72) Inventor: Alex Benbassat, Los Angeles, CA (US)

(73) Assignee: Sony Interactive Entertainment LLC

( * ) Notice: Subject to any disclaimer, the term of this patent is extended or adjusted under 35 U.S.C. 154(b) by 243 days.

(21) Appl. No.: 18/322,895

(22) Filed: May 24, 2023

(65) Prior Publication Data

US 2024/0390806 A1    Nov. 28, 2024

(51) Int. Cl.
| | |
|---|---|
| *A63F 13/86* | (2014.01) |
| *A63F 13/212* | (2014.01) |
| *A63F 13/216* | (2014.01) |
| *A63F 13/798* | (2014.01) |

(52) U.S. Cl.
CPC ............ *A63F 13/86* (2014.09); *A63F 13/212* (2014.09); *A63F 13/216* (2014.09); *A63F 13/798* (2014.09)

(58) Field of Classification Search
CPC ...... A63F 13/86; A63F 13/212; A63F 13/216; A63F 13/798
See application file for complete search history.

(56) References Cited

U.S. PATENT DOCUMENTS

| | | |
|---|---|---|
| 2016/0042648 A1 | 2/2016 | Kothuri |
| 2016/0353252 A1 | 12/2016 | Krasadakis |
| 2017/0003740 A1 | 1/2017 | Verfaillie et al. |
| 2019/0015751 A1* | 1/2019 | Kahn, II ................. A63F 13/67 |
| 2021/0225505 A1 | 7/2021 | Khare et al. |
| 2022/0168634 A1 | 6/2022 | Ambinder et al. |
| 2022/0191348 A1 | 6/2022 | Sarkar |

OTHER PUBLICATIONS

"International Search Report and Written Opinion", dated Aug. 27, 2024, from the counterpart PCT application PCT/US24/29623.

* cited by examiner

*Primary Examiner* — David L Lewis
*Assistant Examiner* — Shauna-Kay Hall
(74) *Attorney, Agent, or Firm* — Kilpatrick Townsend & Stockton LLP

(57) ABSTRACT

A computer game as presented from spectator side may use clusters of marginally high heart rate to infer something interesting occurring on platform, which may be used in turn for video bookmarking highlights, other uses on the platform.

20 Claims, 13 Drawing Sheets

Create/Assemble Training Set Of Sensor Indications, NPC Behaviors ∼1100

Provide To Machine Learning Model To Train ∼1102

*1500*

IDENTIFYING GAME VIDEO HIGHLIGHTS

FIELD

The present application relates generally to techniques for using gamer and/or spectator heart rate streams to identify game video highlights.

BACKGROUND

Spectators can watch others play computer games (also referred to herein as video games) and may want to bookmark particularly interesting parts of such games.

SUMMARY

As understood herein, games from spectator side may use clusters of marginally high (or low) heart rate to infer something interesting occurring on platform, which may be used in turn for video bookmarking highlights, other uses on the platform. The spectators may automatically be presented, for example, with indications of the heart rates of the final two players in a game tournament.

Accordingly, a system includes at least one computer medium that is not a transitory signal and that in turn includes instructions executable by at least one processor assembly to receive plural indications of respective physiological conditions of respective participants in a computer game, each indication being generated by at least one sensor, and to present the indications on at least one display.

The physiological conditions may include heart rate.

In some implementations, the participants can include players of the computer game. If desired, the participants can include spectators of the computer game.

Turning to the display, in example embodiments the display can include a game player system. The display can include a game participant system.

In example embodiments the instructions can be executable to present the indications grouped by geographic location of the participants, and/or by age of the participants, and/or by skill level of the participants.

In another aspect, an apparatus includes at least one display configured to present at least one computer simulation, and at least one processor assembly configured to receive from plural physiological sensors indications of at least one physiological condition of respective plural participants of the computer simulation, and provide the indications to at least one display for presentation thereof.

In another aspect, a method includes receiving indications of physiological parameters from sensors engaged with respective participants in a computer game, and presenting the indications grouped in clusters on at least one display.

The details of the present application, both as to its structure and operation, can be best understood in reference to the accompanying drawings, in which like reference numerals refer to like parts, and in which:

DETAILED DESCRIPTION

Figure 1:
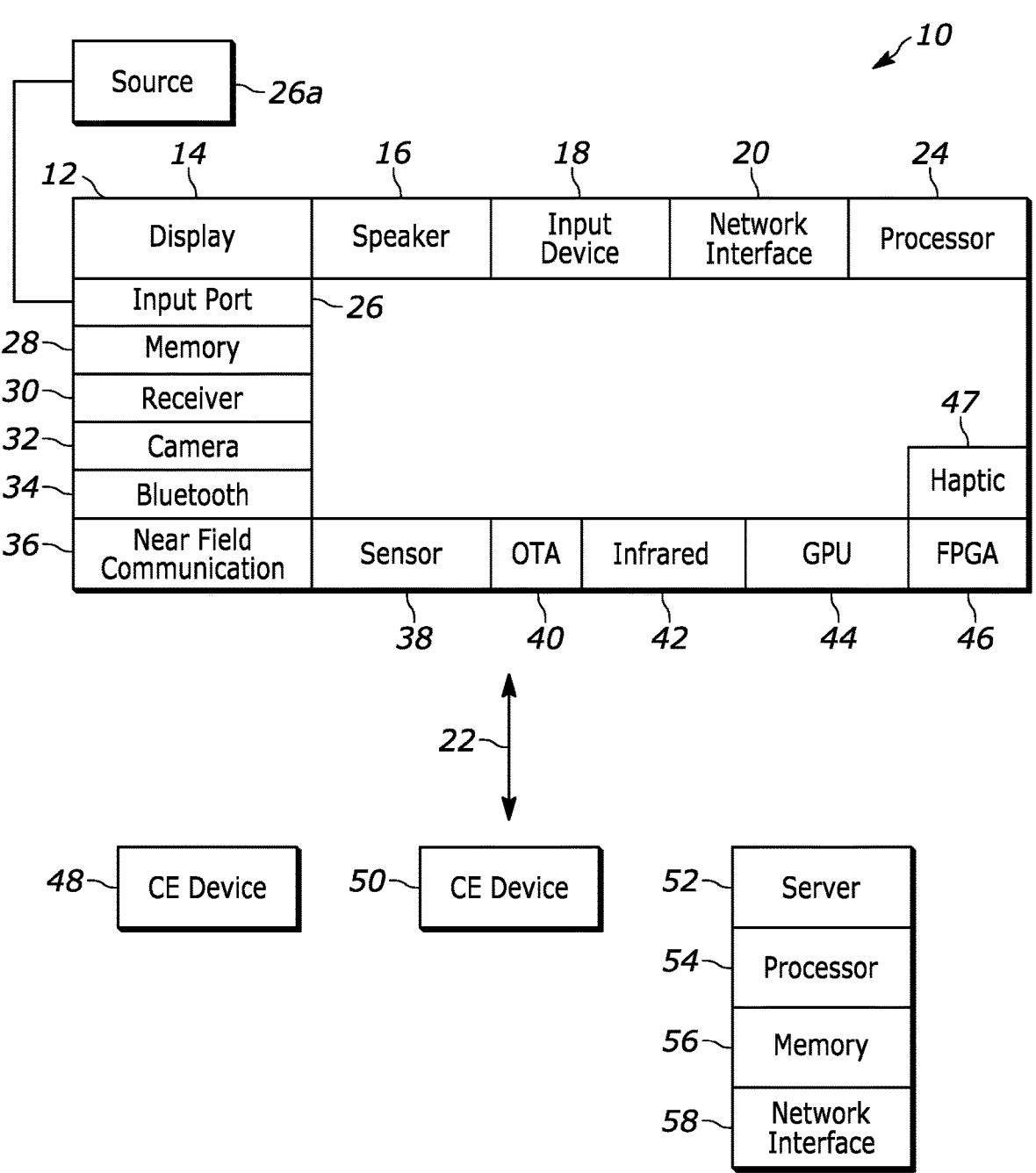
FIG. 1 is a block diagram of an example system including an example in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be a single- or multi-chip processor that can execute logic by means of various lines such as address lines, data lines, and control lines and registers and shift registers. A processor assembly may include one or more processors acting independently or in concert with each other to execute an algorithm.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimension or by an event-based sensors.

Continuing the description of the AVD 12, in some embodiments the AVD 12 may include one or more cameras 32 that may be a thermal imaging camera, a digital camera such as a webcam, an event-based sensor, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command), providing input to the processor 24. The AVD 12 may include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics generators 47 may be provided for generating tactile signals that can be sensed by a person holding or in contact with the device.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

The components shown in the following figures may include some or all components shown in FIG. 1. The user interfaces (UI) described herein may be consolidated, expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models. A network contemplated herein can include a large language model (LLM) such as a generative pre-trained transformer (GPTT).

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
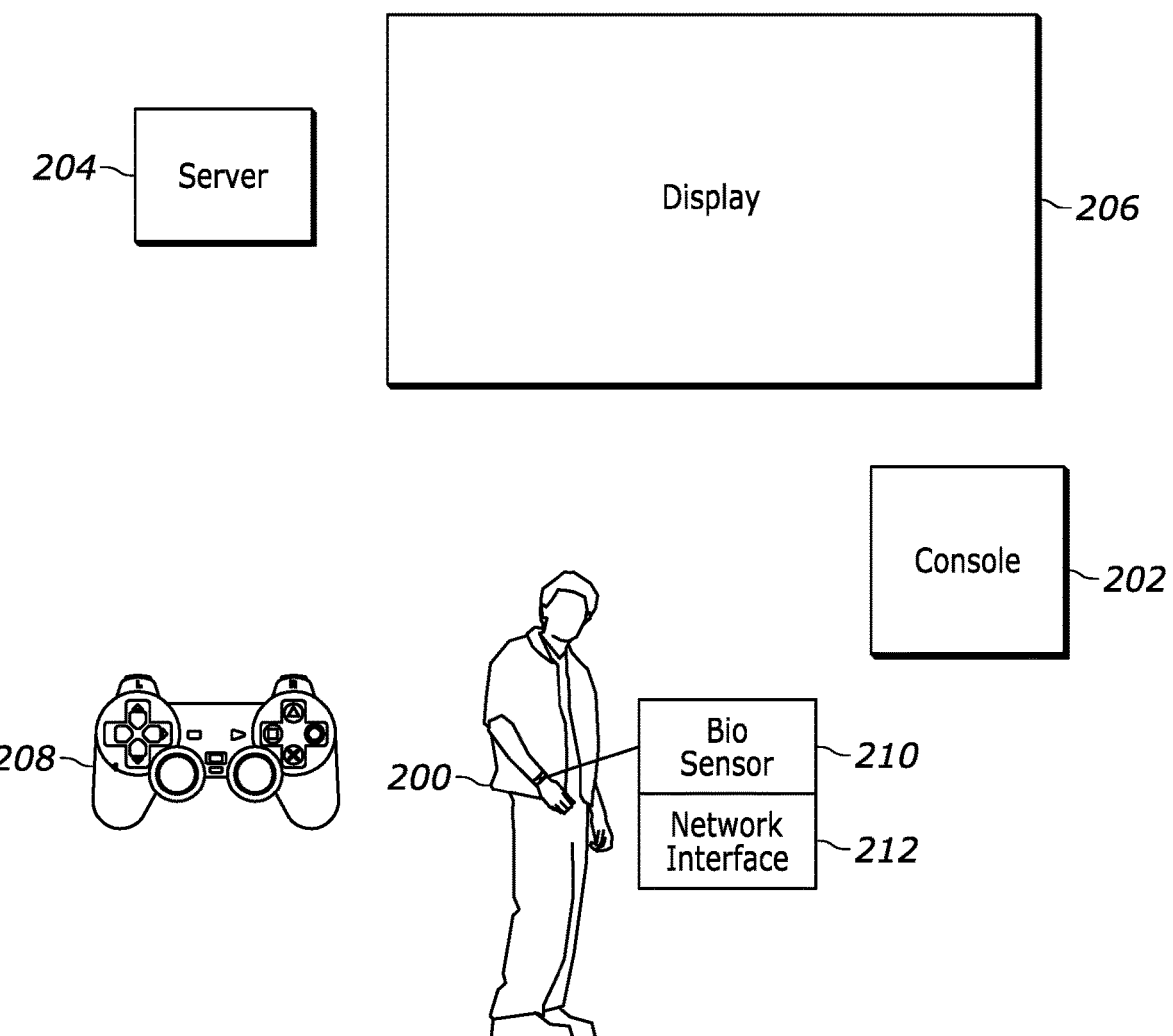
FIG. 2 illustrates an example specific system that may use components from FIG. 1.

Turning to FIG. 2, a computer gamer or player 200 plays a computer game sourced from a computer game console 202 and/or one or more computer game servers 204 as presented on one or more displays 206 by operating one or more computer game controllers 208. One or more biometric sensors 210 may be engaged with the gamer 200 to provide biometric signals to the gaming system via one or more network interfaces 212 such as a wireless transceiver. The biometric signals represent a physical parameter or state of the gamer 200. The signals may be communicated to, e.g., the console 202 via Bluetooth, or the server 204 via Wi-Fi, or by other means.

Disclosure herein uses, as an example biometric sensor, a heart rate or pulse sensor. It is to be understood that other types of biometric sensors with supporting systems include iris sensors, voice sensors, face recognition systems, galvanic skin response (GSR) sensors, breath sensors including breath rate sensors, nanotechnology sensors, and other physiological sensors operating on chemical, electrochemical, optical, and electromagnetic bases.

Figure 3:
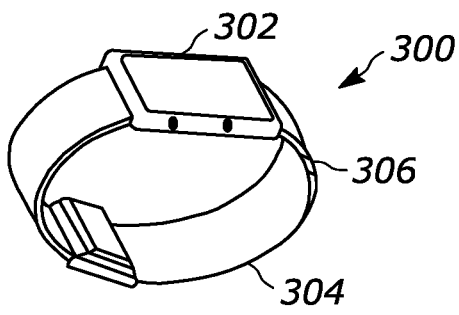
FIG. 3 illustrates an example wristwatch-like device for holding a biometric sensor.
Figure 4:
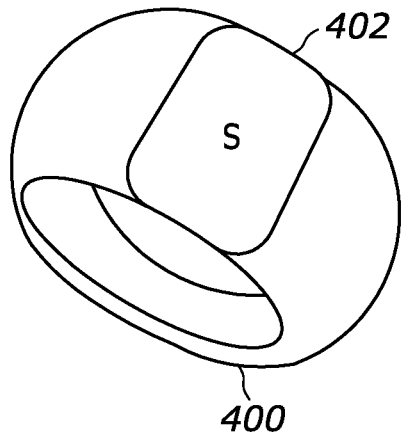
FIG. 4 illustrates an example finger ring for holding a biometric sensor.
Figure 5:
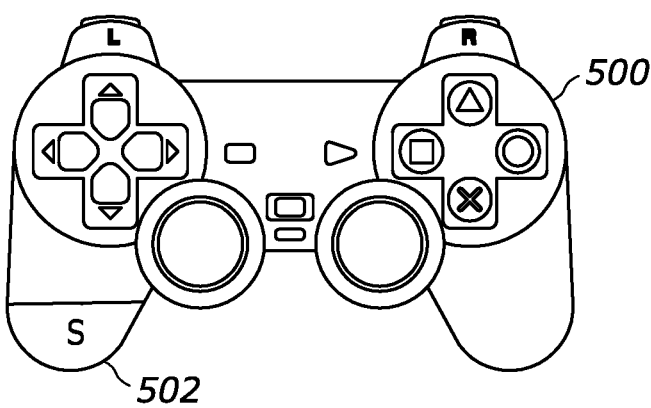
FIG. 5 illustrates an example computer game controller for holding a biometric sensor.

A biometric sensor according to present principles may be engaged with the gamer 200 by various means. In FIG. 3, for instance, a wristwatch-shaped device 300 with face 302 and wristband 304 holds one or more biometric sensors 306. In FIG. 4, a finger ring 400 holds one or more biometric sensors 402. In FIG. 5, a computer game controller 500 holds one or more biometric sensors 502.

Figure 6:
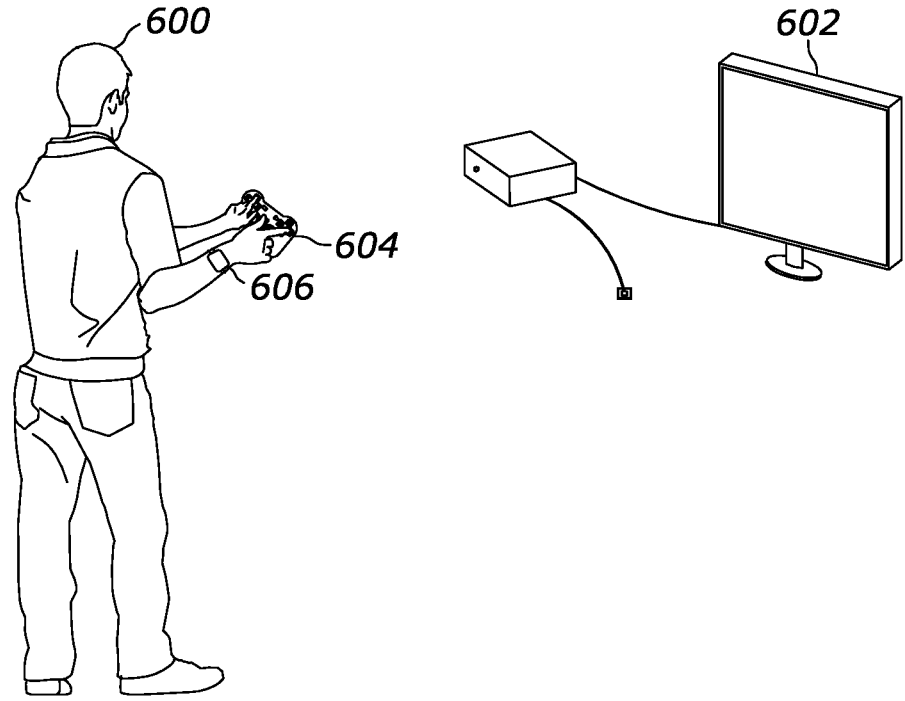
FIG. 6 illustrates a gamer playing a video game.

FIG. 6 illustrates a gamer 600 playing a video game/computer game being presented on a display 602 under control of a manipulable controller 604. A biometric sensor 606 such as a heart rate sensor is engaged with the gamer 600 via a wristwatch-like mount to measure the gamer's pulse, i.e., heart rate.

Figure 7:
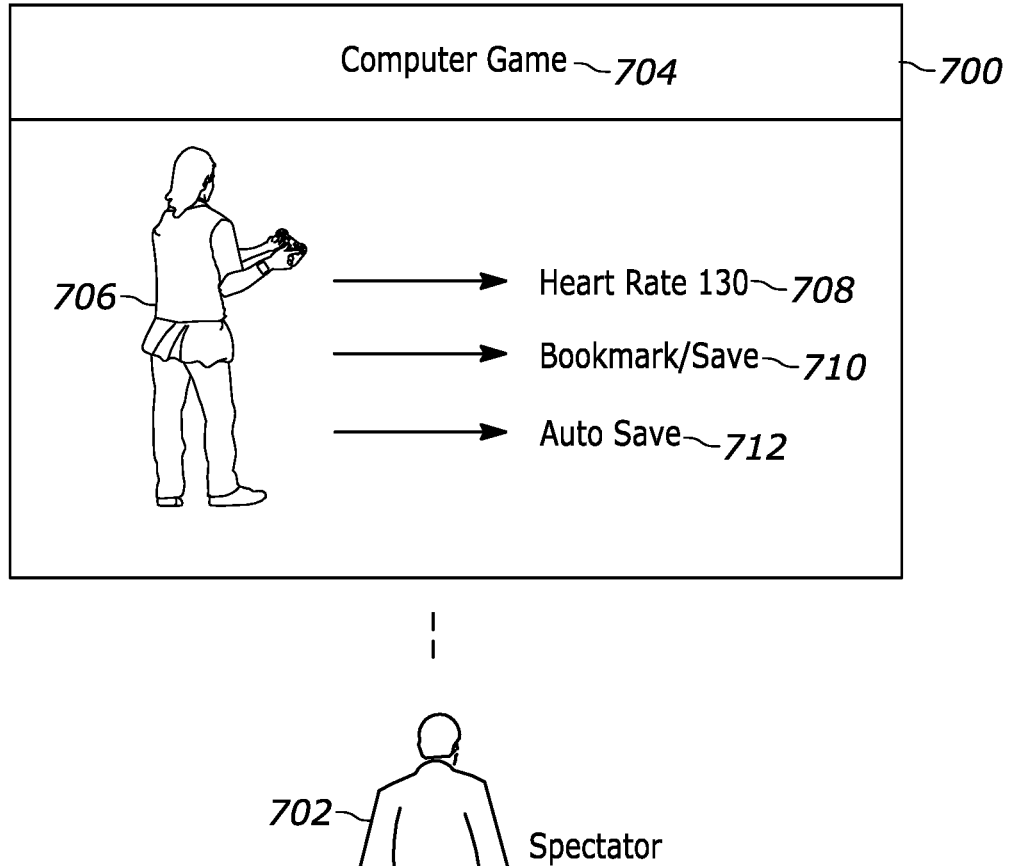
FIG. 7 illustrates a screen shot of a display of a spectator of a computer game.

FIG. 7 illustrates a display 700 that may be associated with a non-playing game spectator 702. A computer game is presented in a window 704, in the example shown, the top half of the display. The display is controlled by a processor assembly.

The processor assembly in the display 700 receives at least one sensor-generated indication of at least one physiological condition, such as heart rate, of a player of the computer game presented in the window 704, for example, of the gamer 600 shown in FIG. 6. A video image 706 of the gamer 600 operating a computer simulation controller to control the computer game shown in the window 704 may be presented on the spectator display 700. The video image 706 may be captured by a camera on the display 602 of the gamer 600.

As shown at 708 in FIG. 7, the indication of the physiological condition of the game 600 such as heart rate may be presented on the display 700 of the spectator 702. Additionally, adjacent to the indication 708, a selector 710 may be presented and may be selectable to bookmark and/or save a currently presented portion of the computer game. For example, selection of the selector 710 may cause a bookmark to be appended to a recording of the computer game, and/or it may create a clip of the last minute or two or other time period of the game before the clip plus the first minute or two or other period after selection.

If desired, the processor assembly of the display 700 may, responsive to the physiological condition satisfying a test, automatically bookmark and/or a currently presented portion of the computer game. In other words, regardless of selection or not of the selector 710, if heart rate of the gamer for example exceeds a threshold, a bookmark to be appended to a recording of the computer game, and/or it may create a clip of the last minute or two or other time period of the game before the clip plus the first minute or two or other period after selection. Or, if heart rate of the gamer for example falls below a threshold (unusually low pulse), a bookmark to be appended to a recording of the computer game, and/or it may create a clip of the last minute or two or other time period of the game before the clip plus the first minute or two or other period after selection. If desired, automatic capture/bookmarking may be enabled by a selector 712.

Figure 8:
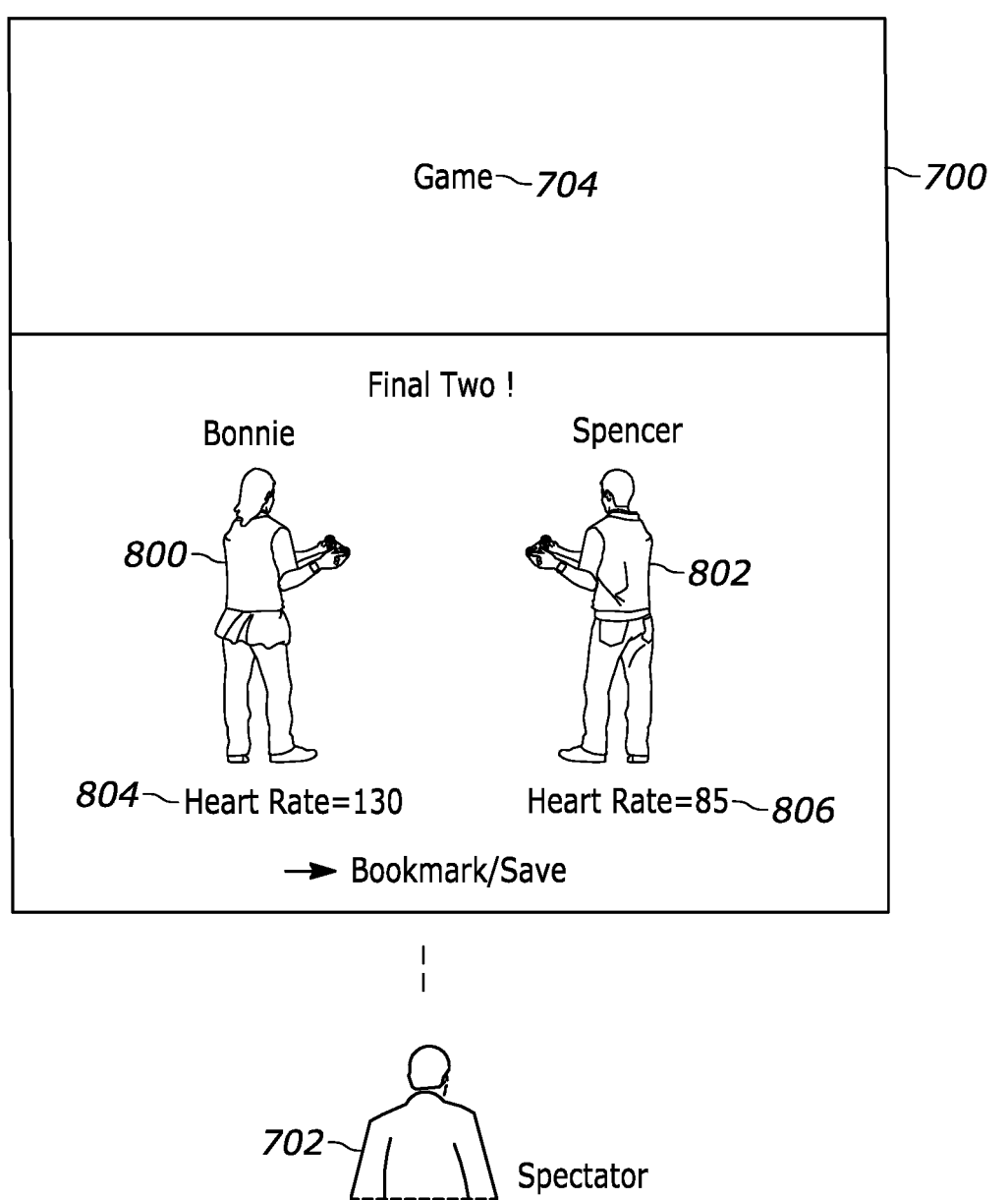
FIG. 8 illustrates another screen shot of a display of a spectator of a computer game.

FIG. 8 illustrates another screen shot that may be presented on the display 700. Below the computer game window 704, video images 800, 802 of, for example, the final two players of a computer game tournament can be presented along with respective indications 804, 806 of their physiological conditions, e.g., heart rates. A bookmark/save selector 808 also may be presented.

Figure 9:
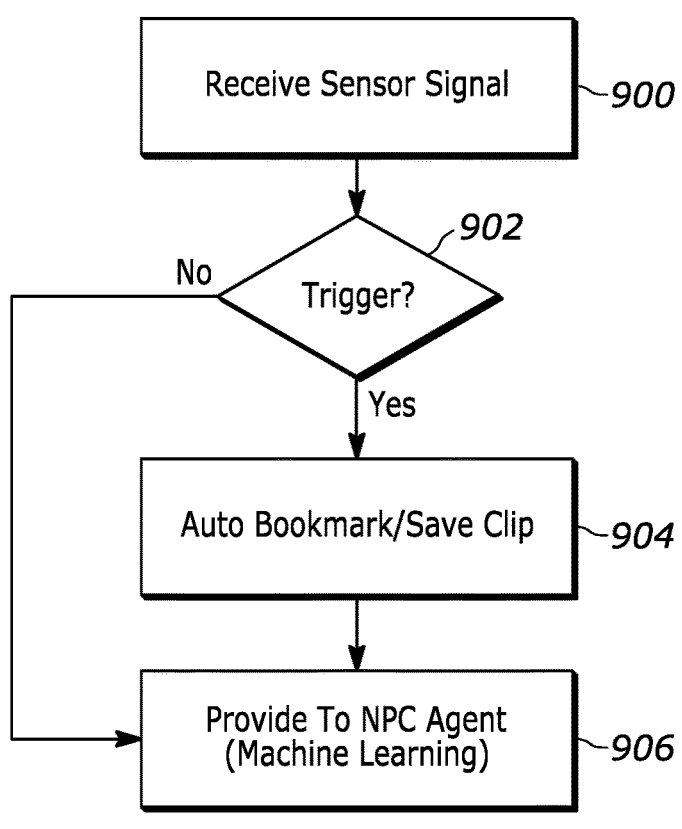
FIG. 9 illustrates example logic in example flow chart format consistent with present principles.

FIG. 9 illustrates example logic. Commencing at block 900, a sensor signal is received by any one or more processors herein indicating a physiological condition of a player of a computer game, e.g., heart rate. When auto-bookmark and save is enabled and the condition satisfies a trigger such as a heart rate being above a threshold at state 902, the logic may move to state 904 to automatically bookmark a recording to the game and/or create or save a clip of the game around the period of the trigger at state 902.

Also, as shown at state 906 in FIG. 9, the indication of physiological condition may be provided to a machine learning (ML) model-implemented agent controlling a non-player character (NPC) in the computer game.

Figure 10:
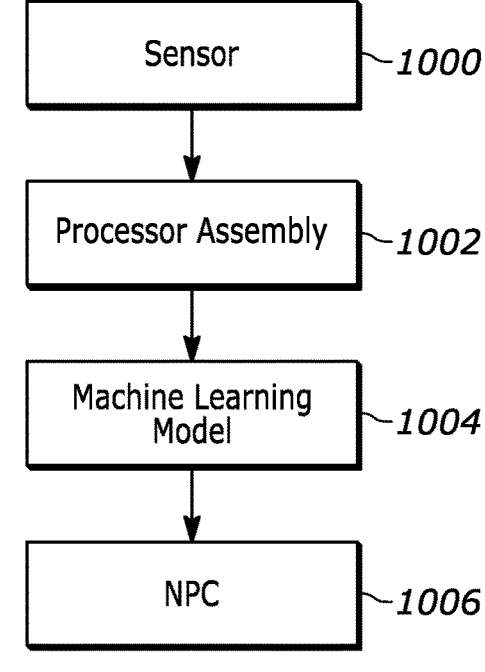
FIG. 10 illustrates an architecture of combined hardware and software components.

FIG. 10 illustrates further. Signals from one or more physiological sensors 1000 are provided to one or more processor assemblies 1002, which input indications from the signals to one or more ML models 1004 controlling one or more NPCs 1006. In this way, behavior of an NPC as controlled by a ML model 1004 can change depending on the physiological condition of a human gamer playing the game in which the NPC appears.

Figure 11:
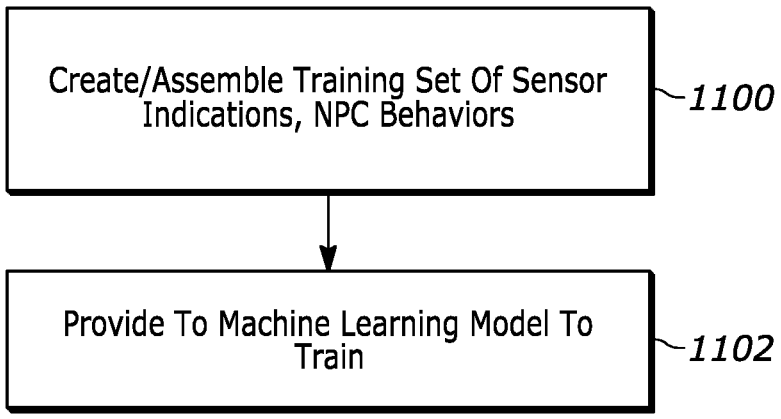
FIG. 11 illustrates example logic in example flow chart format for training the NPC agent.

FIG. 11 illustrates training techniques for the ML model 1004 shown in FIG. 10. A training set of data is created or assembled at state 1100. The training set includes pairs of physiological conditions such as heart rates along with NPC behaviors associated with the heart rates. The behaviors may be defined by human experts and/or extracted from games that were highly rated by gamers and spectators and that included measurements of the physiological conditions of the gamers. The training set is input to the ML model at block 1102 to train the model.

Figure 12:
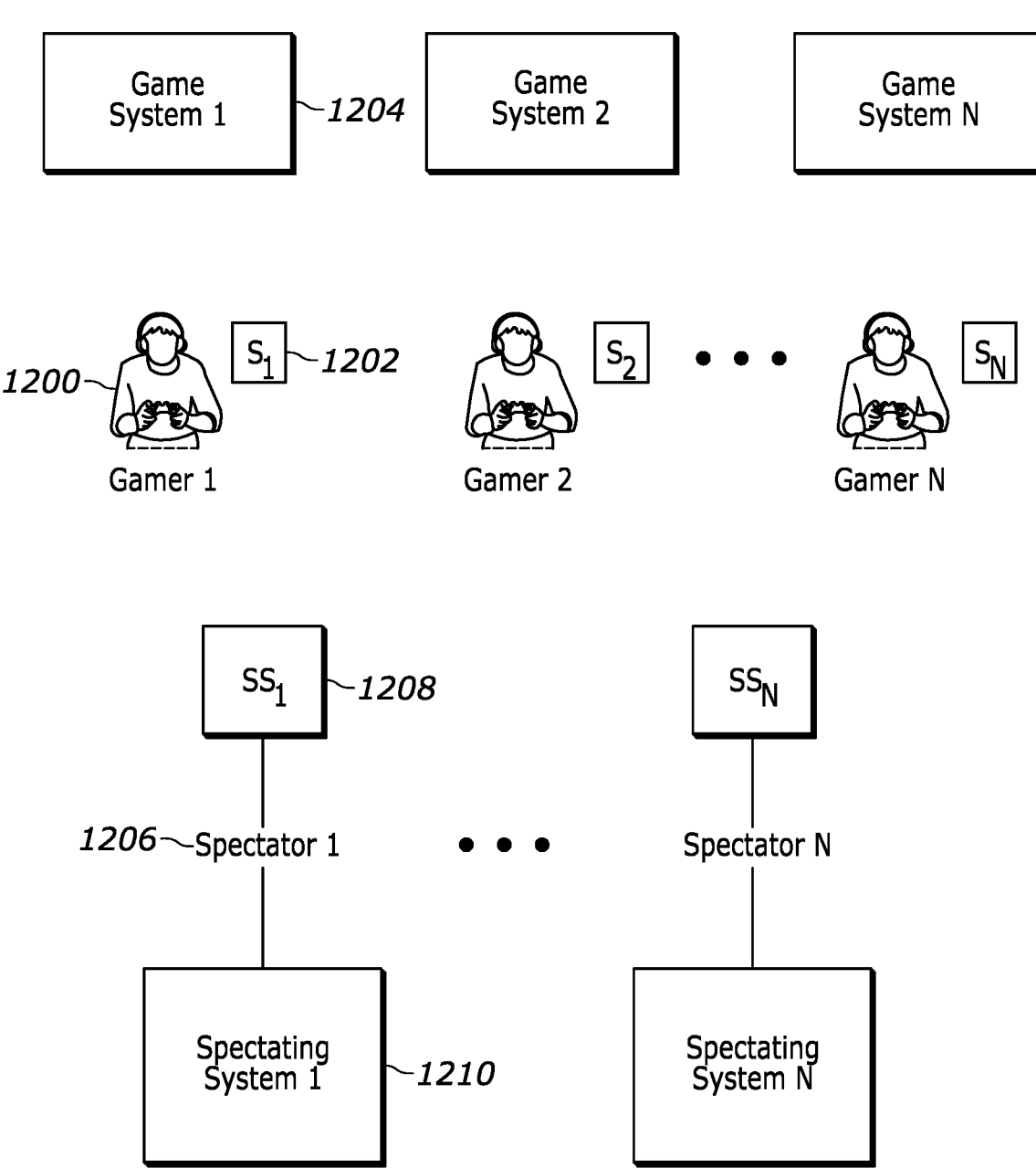
FIG. 12 schematically illustrates a distributed computer game system with multiple players and spectators.

Turn now to FIG. 12. Plural game players 1200 each with at least one respective physiological sensor 1202 are shown playing a computer simulation such as a computer game using respective game systems 1204. The players 1200 may play against each other, for example, in a competition using the same computer game by, e.g., controlling respective player characters (PC) in the game.

Also, plural spectators 1206 each with at least one respective physiological sensor 1208 are shown spectating the computer game using respective spectator systems 1210. Both the players 1200 and spectators 1206 may be considered to be game participants, although the spectators do not control a PC but may be limited to watching the action only and in some cases inputting comments.

Figure 13:
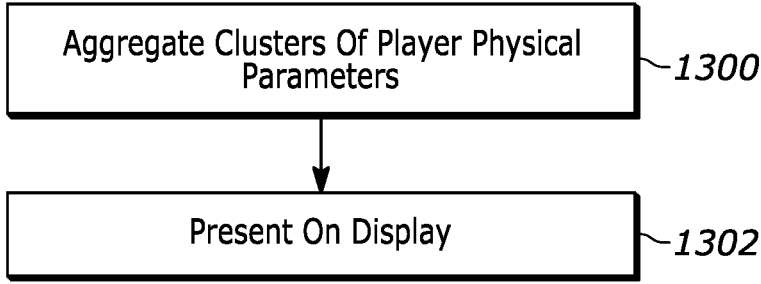
FIG. 13 illustrates first example logic in example flow chart format consistent with FIG. 12.
Figure 14:
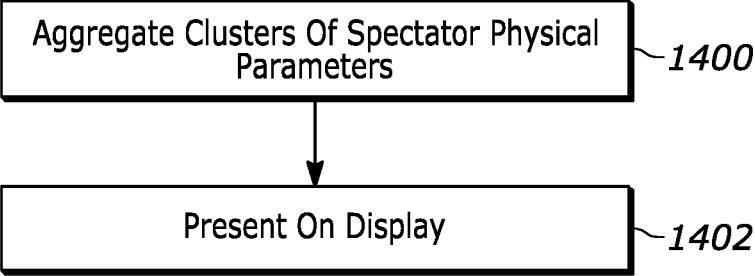
FIG. 14 illustrates second example logic in example flow chart format consistent with FIG. 12.

With FIG. 12 in mind, next consider FIGS. 13 and 14. In FIG. 13, at block 1300 clusters of player physical parameters such as heart rates may be aggregated for presentation at block 1302 on one or more displays, such as on one or more of the game/spectator systems shown in FIG. 12.

On the other hand, in FIG. 14, at block 1400 clusters of spectator physical parameters such as heart rates may be aggregated for presentation at block 1402 on one or more displays, such as on one or more of the game/spectator systems shown in FIG. 12.

Figure 15:
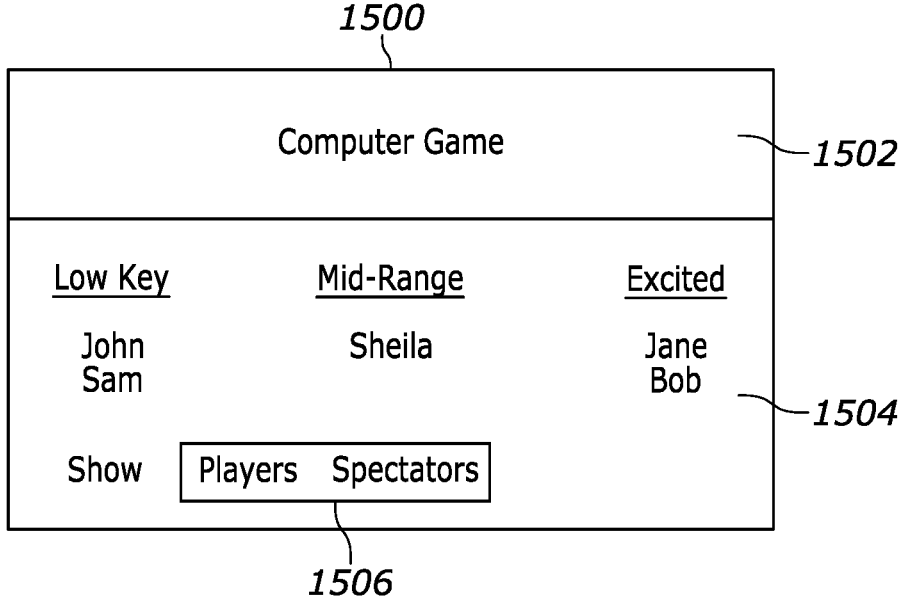
FIG. 15 illustrates a first screen shot illustrating clusters by physiological parameters consistent with FIG. 12.

FIG. 15 illustrates an example user interface derived from FIG. 13. A display 1500 such as any of the displays herein presents a computer game in a window 1502. Also, an aggregation window 1504 presents players by name, clustered in accordance with their current physiological state as indicated by their respective physiological sensors. Note that the actual numeric indications output by the sensors may be presented but in FIG. 15, qualitative indications 1506 are shown, in which, for example, players with low heart rates (e.g., less than 80 BPM) are clustered in a "low-key" column, players with mid-range heart rates (e.g., 80-100 BPM) are clustered in a "mid-range" column, and players with a high heart rate are clustered in an "excited" column.

Figure 16:
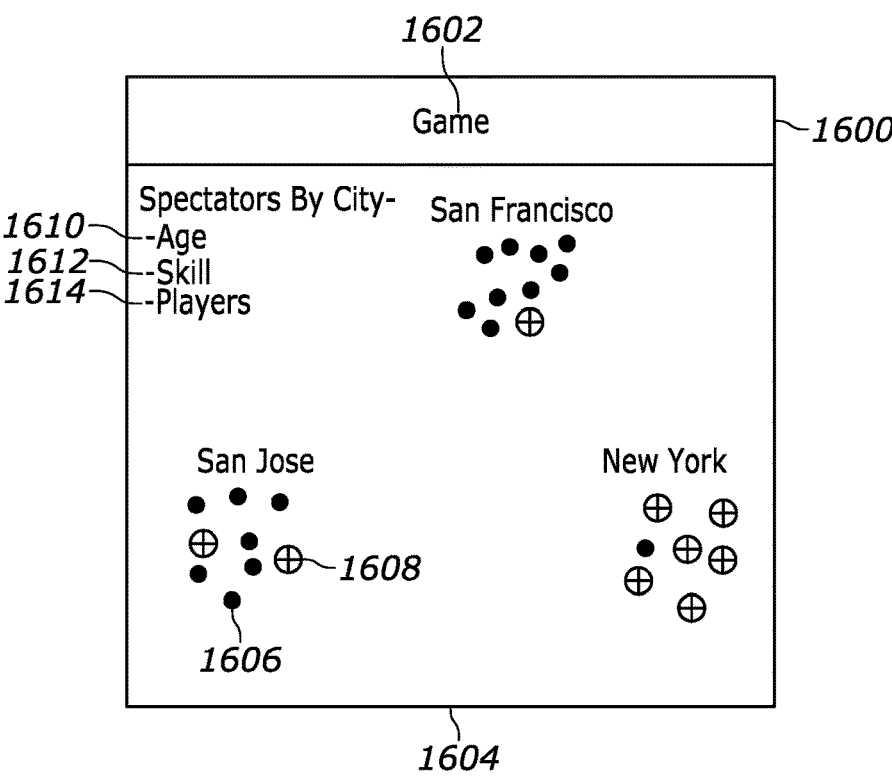
FIG. 16 illustrates a second screen shot illustrating clusters by physiological parameters consistent with FIG. 12.

If desired, a selector 1506 may be provided to toggle between viewing the physiological states of players and those of spectators, as shown in FIG. 16.

FIG. 16 illustrates an example user interface derived from FIG. 14. A display 1600 such as any of the displays herein presents a computer game in a window 1602. Also, an aggregation window 1604 presents spectator indicators. The indicators may be the names of the spectators but in the example shown, the indicators are symbols. Dots 1606 indicate respective spectators with low heart rates, as an example, while circles with plus signs 1608 represent respective spectators with high heart rates, as indicated by their respective physiological sensors. The dividing line between low and high may be, e.g., 90 BPM in non-limiting examples. More than two categories of physiological state symbols may be used. The two categories shown in FIG. 16 are for illustration only.

The clustering in FIG. 16 is geographic, showing symbols of spectators in three cities, namely, San Jose, San Francisco, and New York, along with the appropriate symbol for each spectator as indicated by their respective physiological sensors. Geographic clustering may use other than city divisions, and may include state divisions and national divisions, for instance.

Figure 17:
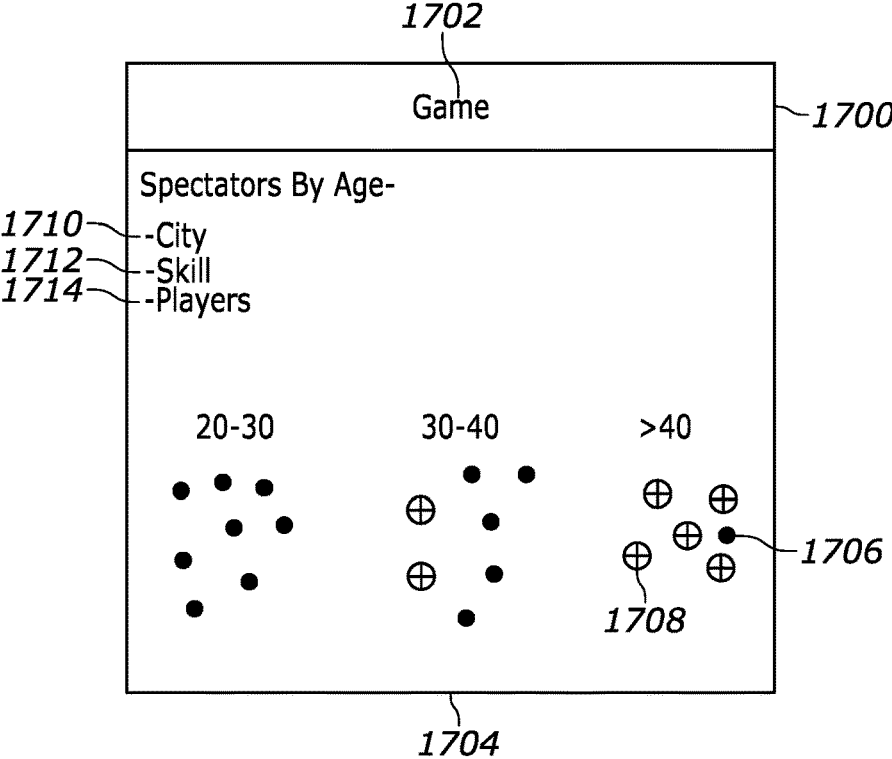
FIG. 17 illustrates a third screen shot illustrating clusters by physiological parameters consistent with FIG. 12.
Figure 18:
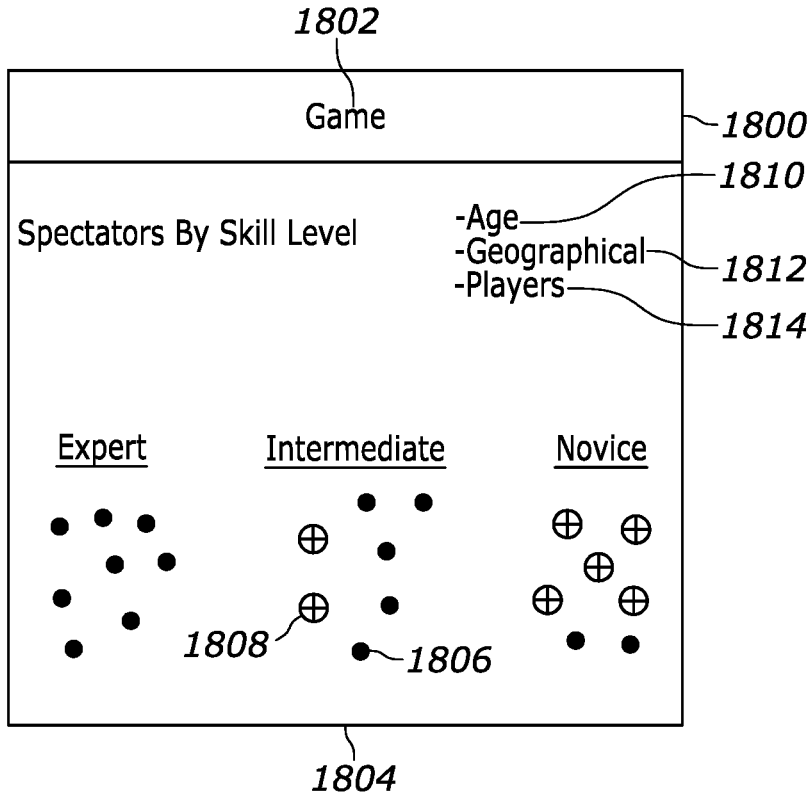
FIG. 18 illustrates a fourth screen shot illustrating clusters by physiological parameters consistent with FIG. 12.

Selectors 1610, 1612, and 1614 may be provided and may be respectively selectable to invoke the UIs of FIG. 17 (age), FIG. 18 (skill level), and FIG. 15 (players).

FIG. 17 illustrates an example user interface derived from FIG. 14. A display 1700, as any of the displays herein presents a computer game in a window 1702. Also, an aggregation window 1704 presents spectator indicators. The indicators may be the names of the spectators but in the example shown, the indicators are symbols. Dots 1706 indicate respective spectators with low heart rates, as an example, while circles with plus signs 1708 represent respective spectators with high heart rates, as indicated by their respective physiological sensors. The dividing line between low and high may be, e.g., 90 BPM in non-limiting examples. More than two categories of physiological state symbols may be used. The two categories shown in FIG. 17 are for illustration only.

The clustering in FIG. 17 is by age, showing symbols of spectators in three example age groups, namely, 20-30 years old, 30-40 years old, and over 40 years old, along with the appropriate symbol for each spectator as indicated by their respective physiological sensors. Age clustering may use other than the divisions shown.

Selectors 1710, 1712, and 1714 may be provided and may be respectively selectable to invoke the UIs of FIG. 16 (geographic), FIG. 18 (skill level), and FIG. 15 (players).

FIG. 18 illustrates an example user interface derived from FIG. 14. A display 1800 such as any of the displays herein presents a computer game in a window 1802. Also, an aggregation window 1804 presents spectator indicators. The indicators may be the names of the spectators but in the example shown, the indicators are symbols. Dots 1806 indicate respective spectators with low heart rates, as an example, while circles with plus signs 1808 represent respective spectators with high heart rates, as indicated by their respective physiological sensors. The dividing line between low and high may be, e.g., 90 BPM in non-limiting examples. More than two categories of physiological state symbols may be used. The two categories shown in FIG. 18 are for illustration only.

The clustering in FIG. 18 is by skill level, showing symbols of spectators in three example skill groups, namely, expert, intermediate, and novice, along with the appropriate symbol for each spectator as indicated by their respective physiological sensors. Skill level clustering may use other than the divisions shown.

Selectors 1810, 1812, and 1814 may be provided and may be respectively selectable to invoke the UIs of FIG. 17 (age), FIG. 16 (geographic), and FIG. 15 (players).

Note that the clustering categories described here can be derived from player/spectator profiles that are typically maintained within a computer gaming system. By noting which players and spectators are logged on, the identities of the people, their corresponding physiological parameters, and relevant clustering information can be correlated for presentation.

While the particular embodiments are herein shown and described in detail, it is to be understood that the subject matter which is encompassed by the present invention is limited only by the claims.

What is claimed is:

1. One or more non-transitory computer-readable media comprising computer-executable instructions that, when executed by one or more processors of an electronic device associated with a participant of a computer game being played by a player, cause the electronic device to perform operations comprising:

presenting, on a display of the electronic device, a plurality of visual representations, wherein each visual representation of the plurality of visual representations corresponds to a different participant of a plurality of participants participating in the computer game;

receiving a plurality of data values, wherein each data value of the plurality of data values is generated by a sensor and corresponds to a physiological condition of a different participant of the plurality of participants in the computer game;

presenting, on the display, at least one data value of the plurality of data values that is associated with a first visual representation of the plurality of visual representations;

determining that one or more data values of the plurality of data values satisfies a threshold condition; and changing, on the display, the first visual representation from a first graphic to a second graphic based on the one or more data values of the plurality of data values satisfying the threshold condition.

2. The one or more non-transitory computer-readable media of claim 1, wherein the physiological condition comprises a heart rate.

3. The one or more non-transitory computer-readable media of claim 1, wherein the plurality of participants comprise players of the computer game.

4. The one or more non-transitory computer-readable media of claim 1, wherein the plurality of participants comprise spectators of the computer game.

5. The one or more non-transitory computer-readable media of claim 1, wherein the electronic device comprises a game player system.

6. The one or more non-transitory computer-readable media of claim 1, wherein the electronic device comprises a game participant system.

7. The one or more non-transitory computer-readable media of claim 1, wherein presenting the plurality of visual representations includes presenting each visual representation of the plurality of visual representations in a visual cluster based at least in part on, for each participant of the plurality of participants, an age, skill, or geography of the participants.

8. The one or more non-transitory computer-readable media of claim 7, prior to presenting the plurality of visual representations in the visual cluster, determining the age, skill, or geography of each participant of the plurality of participants.

9. An apparatus comprising:

a memory comprising computer-executable instructions; and a processor configured to access the memory and execute the computer-executable instructions to perform operations comprising:

presenting, on a display of an electronic device, a plurality of visual representations, wherein each visual representation of the plurality of visual representations corresponds to a different participant of a plurality of participants participating in a computer game;

receiving a plurality of data values, wherein each data value of the plurality of data values is generated by a sensor and corresponds to a physiological condition of a different participant of the plurality of participants of the computer game;

presenting, on the display, at least one data value of the plurality of data values that is associated with a first visual representation of the plurality of visual representations;

determining that one or more data values of the plurality of data values satisfies a threshold condition; and changing, on the display, the first visual representation from a first graphic to a second graphic based on the one or more data values of the plurality of data values satisfying the threshold condition.

10. The apparatus of claim 9, wherein the sensor comprise a heart rate sensor.

11. The apparatus of claim 9, wherein presenting the plurality of visual representations includes presenting each visual representation of the plurality of visual representations in a visual cluster based at least in part on, for each participant of the plurality of participants, an age, skill, or geography of each participant of the plurality of participants.

12. The apparatus of claim 11, wherein the memory comprises additional computer-executable instructions and the processor is further configured to access the memory and execute the additional computer-executable instructions to perform additional operations comprising:

prior to presenting the plurality of visual representations in the visual cluster, determining the age, skill, or geography of each participant of the plurality of participants.

13. The apparatus of claim 9, wherein the memory comprises additional computer-executable instructions and the processor is further configured to access the memory and execute the additional computer-executable instructions to perform additional operations comprising:

presenting, on the display, at least one selector selectable to switch between presenting, of the plurality of visual representations, at least one of visual representations of players or spectators.

14. A computer-implemented method comprising:

presenting, on a display of an electronic device, a plurality of visual representations, wherein each visual representation of the plurality of visual representations corresponds to a different participant of a plurality of participants participating in a computer game;

receiving a plurality of data values, wherein each data value of the plurality of data values is generated by a sensor and corresponds to a physiological condition of a different participant of the plurality of participants in the computer game;

presenting, on the display, at least one data value of the plurality of data values that is associated with a first visual representation of the plurality of visual representations;

determining that one or more data values of the plurality of data values satisfies a threshold condition; and changing, on the display, the first visual representation from a first graphic to a second graphic based on the one or more data values of the plurality of data values satisfying the threshold condition.

15. The computer-implemented method of claim 14, wherein presenting the plurality of visual representations includes presenting each visual representation of the plurality of visual representations in a visual cluster based at least in part on, for each participant of the plurality of participants, an age, skill, or geography of each participant of the plurality of participants.

16. The computer-implemented method of claim 15, further comprising, prior to presenting the plurality of visual representations in the visual cluster, determining the age, skill, or geography of each participant of the plurality of participants.

17. The computer-implemented method of claim 14, further comprising presenting at least one selector to select between presenting, of the plurality of visual representations, at least one of visual representations of players or spectators.

18. The one or more non-transitory computer-readable media of claim 1, further comprising additional computer-executable instructions that, when executed by the one or more processors, cause the electronic device to perform additional operations comprising presenting at least one selector to select between presenting, of the plurality of visual representations, at least one of visual representations of players or spectators.

19. The apparatus of claim 9, wherein the physiological condition comprises a heart rate.

20. The computer-implemented method of claim 16, wherein the physiological condition comprises a heart rate.

* * * * *